3,413,325
ALKOXYALKOXY VANADIUM-IV COMPOUNDS AND THEIR PREPARATION

Henry Edward Berkheimer, Wilmington, Del., assignor to E. I. du Pont de Nemours and Company, Wilmington, Del., a corporation of Delaware
No Drawing. Filed June 30, 1966, Ser. No. 561,765
7 Claims. (Cl. 260—429)

This invention relates to novel alkoxyalkoxy vanadium compounds, to methods of making the same and to their use as catalyst components in the coordination catalyzed polymerization of olefins.

The alkoxyalkoxy vanadium compounds of the present invention can be represented by the formula:

$$[R\!-\!O\!-\!Y\!-\!O]_b VX_{4-b}$$

wherein R is a $C_1$ to $C_6$ alkoxy radical (including branched alkyl radicals), Y is an alkylene radical having 2 to 3 carbon atoms in the chain linking the two oxygen atoms and otherwise may contain side chains to give Y a total of up to 10 carbon atoms, X is chlorine or bromine and wherein $b$ is an integer from 1 to 4 inclusive.

This invention includes a method for making the above compounds which comprises contacting and reacting about $b$ moles of an alkoxy alcohol having the formula:

$$R\!-\!O\!-\!Y\!-\!OH$$

with $VX_4$ wherein R, X, Y, and $b$ have the same significance as previously described. The reaction is conducted preferably in an inert organic solvent. The halogen halide, HX, which is formed must be removed from the reaction medium preferably by an acid-accepting additive which forms an easily separable product. Preferred acid-accepting compounds are lower aliphatic tertiary amines such as triethylamine.

The alkoxyalkoxy vanadium compounds of this invention can be used to form novel coordination catalysts by mixing the alkoxyalkoxy vanadium compounds with at least 6 moles of an organoaluminum reducing agent. The coordination catalyst system should preferably include a halogen, preferably chlorine or bromine, which can be supplied by the vanadium compound, by the organoaluminum compound or by the use of a halogenated diluent such as tetrachloroethylene or methylene chloride. The preferred reducing agents are the diorgano aluminum halides and particularly the di(lower alkyl) aluminum chlorides such as diisobutyl aluminum chloride.

Representative examples of the vanadium compounds of the present invention are:

| | |
|---|---|
| $(CH_3\!-\!O\!-\!CH_2CH_2\!-\!O)_4V$ | Tetrakis($\beta$-methoxy ethoxy) vanadium. |
| $(CH_3CH_2\!-\!O\!-\!CH_2CH_2\!-\!O)_4V$ | Tetrakis($\beta$-ethoxy-ethoxy) vanadium. |
| $(CH_3CH_2CH_2CH_2\!-\!O\!-\!CH_2CH_2\!-\!O)_4V$ | Tetrakis($\beta$-n-butoxy ethoxy) vanadium. |
| $[(CH_3)_2CH\!-\!CH_2\!-\!O\!-\!CH_2CH_2O]_4V$ | Tetrakis($\beta$-isobutoxy ethoxy) vanadium. |
| $(CH_3CH_2O\!-\!CH_2CH_2CH_2\!-\!O)_4V$ | Tetrakis($\gamma$-ethoxy propoxy) vanadium. |
| 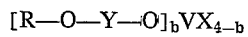$(CH_3\!-\!O\!-\!CH\!-\!CH_2O)_4V$ | Tetrakis($\beta$-methoxy isopropoxy) vanadium. |
| $(CH_3CH_2\!-\!O\!-\!CH_2CH_2\!-\!O)_3VCl$ | Tris($\beta$-ethoxy ethoxy) vanadium chloride. |
| $(CH_3CH_2\!-\!O\!-\!CH_2CH_2\!-\!O)_2VCl_2$ | Bis($\beta$-ethoxyethoxy) vanadium dichloride. |
| $CH_3CH_2\!-\!O\!-\!CH_2CH_2\!-\!OVCl_3$ | $\beta$-Ethoxyethoxy vanadium trichloride. |
| $((CH_3)_2CH\!-\!O\!-\!CH_2CH_2CH_2\!-\!O)_2VBr_2$ | Bis($\gamma$-isopropoxypropoxy) vanadium dibromide. |

The preferred species are the vanadium tetraalkoxy-alkoxides. These compounds can be made by a known method for the manufacture of vanadium tetraalkoxides which have been described by I. M. Thomas Can. J. Chem. 39 1386–8 (1961) and by D. C. Bradley and L. M. Meltta Can. J. Chem. 40 1183–8 (1962). This method of making the alkoxyalkoxides of the present invention is illustrated in Example I.

In view of the difficulty encountered in making vanadium tetraalkoxides and the indirect method which it was found necessary to employ, as shown in the above references, it is particularly surprising that the alkoxyalkoxides of vanadium can be made by a simple and inexpensive process. This process is to react a vanadium tetrahalide, $VX_4$, with $b$ molar proportions of an alkoxy alcohol, removing the hydrogen halide formed. Many suitable alkoxy alcohols are available commercially under the tradename "Cellosolve." Other alkoxy alcohols can be made by standard organic chemical methods.

The preparation of the vanadium alkoxyalkoxides can be performed in a wide variety of organic solvents which can be aliphatic, cycloaliphatic, aromatic or aromatic or aralkyl solvents such as hexane, heptane, decane, cyclohexene, benzene, toluene, and xylene or ethers such as diethyl ether, furane, dioxane and the like. The solvent should be free of active hydrogen atoms.

The reaction can be conducted at atmospheric pressure, but higher or lower pressures can also be employed.

The temperature of the reaction is not critical, but is suitably from room temperature to about 100° C. A convenient method of preparation is to reflux the reacting ingredients in the solvent at atmospheric pressure.

The hydrogen halide product should be removed, particularly if the alkoxy alkoxy vanadium compounds are to be employed for the formation of coordination catalysts. When the resultant vanadium compound contains halogen the hydrogen halide can frequently be removed by sparging with nitrogen or by vacuum drying or a combination of these methods. In the case of the preferred vanadium compounds containing four alkoxy-alkoxy groups it has been found that a complex is apparently formed with the hydrogen halide, which is accordingly difficult to remove by such methods. In this case it is preferred to add a lower aliphatic tertiary amine in an amount sufficient to react with the liberated hydrogen halide. The resultant tertiary amine hydrohalides are substantially insoluble in the organic solvents employed and can be removed from the reaction medium by mechanical means such as filtration, centrifugation, or the like. The alkoxyalkoxy vanadium compounds can be recovered from the solution, if desired, by evaporation of the solvent, preferably under vacuum. When the tetraalkoxide is not too soluble in saturated hydrocarbons, the preparation can be carried out in a more polar solvent medium which will preferentially dissolve only the vanadium compound as before. Diethyl ether is an example; benzene is a less preferred alternative.

The novel alkoxyalkoxy vanadium compounds of the present invention are particularly valuable for the formation of highly active coordination catalyst systems. The alkoxyalkoxy vanadium compounds, particularly the compounds wherein R is ethyl or higher alkyl radicals, are generally more soluble in organic solvents such as hexane and tetrachloroethylene than other vanadium compounds suitable for use in catalysts and the volume of catalyst feed solution in the continuous polymerization of olefins is minimized which is of great value in industrial operations.

The coordination catalysts are made in solution in a suitable polymerization solvent by reacting the selected vanadium alkoxyalkoxy compound with at least 6 moles of an organoaluminum compound. As much as 100 moles or more of the organoaluminum compound can be employed. Generally, the preferred range is from about 10 to about 30 moles of the organoaluminum compound per mole of the vanadium alkoxyalkoxy compound. The catalyst can be pre-formed or can be formed in the presence of the olefins which it is desired to polymerize.

The preferred organoaluminum compounds are the dialkyl aluminum chlorides or bromides wherein the alkyl groups can have from 2 to 20 carbon atoms. Diisobutyl aluminum chloride is particularly preferred. Other organoaluminum compounds such as the aromatic aluminum compounds, trialkyl aluminum compounds, monoorgano aluminum dihalides and organoaluminum sesqui-halides can also be employed.

A wide variety of organic solvents which are inert to the catalyst components can be used as the polymerization media. The catalysts are, however, particularly suited to the production of elastomeric, non-crystalline copolymers of the α-olefins, optionally with certain non-conjugated diolefins. In general such elastomers are recovered from the reaction medium by evaporation of the solvent or diluent and accordingly it is preferred to use solvents which are volatile. Particularly preferred solvents are pentane, hexane, cyclohexane and tetrachloroethylene.

The coordination catalysts of the present invention are preferably made and employed for the polymerization of olefins at a temperature in the range between about 0° C. to 40° C. Below about 0° C. the catalyst formation rate is unduly low, while above 40° C. the rate of decay of the catalyst is undesirably high. Temperatures at about ambient temperature are generaly suitable and are preferred for operating convenience.

Olefins which can be polymerized alone or with other olefins employing the catalysts of this invention include the aliphatic α-olefins having from 2 to 20 carbon atoms of which ethylene, propylene and 1-butene are particularly preferred since they are low in cost and are known to yield a variety of useful homopolymers and copolymers. Norbornene can also be homopolymerized and copolymerized with the catalysts of the present invention. Non-conjugated dienes, particularly those containing a single double bond polymerizable with coordination catalysts such as 1:4-hexadiene and higher homologues thereof, 5-methylene norbornene, dicyclopentadiene, 1,5-cyclooctadiene, alkenyl norbornenes and the like are particularly useful for the production of sulfur-curable saturated-backbone hydrocarbon elastomers when copolymerized with one or more polymerizable monoolefins. Particularly valuable elastomers can be made by copolymerizing ethylene and propylene and a non-conjugated diene to form polymers containing about equal proportions by weight of ethylene and propylene together with from about 0.1 to 3 grams moles/kilogram of polymer of the non-conjugated diene. Other valuable terpolymers include ethylene/norbornene copolymerized with a non-conjugated diene such as 1,4-hexadiene.

The polymerization can be conducted in any conventional vessel continuously or batchwise, generally at a pressure of from 1 to 100 atmospheres. Monomers may be added continuously or incrementally. The polymeric products may be recovered and purified by the usual techniques known to those skilled in the art.

This invention is further illustrated by the following examples which should not, however, be construed as fully delineating the scope thereof.

EXAMPLE I

Preparation of tetrakis-(β-isobutoxyethoxy)vanadium from tetrakis-(diethylamido)vanadium Twenty milliliters of a 0.72 molar benzene solution of tetrakis(diethylamido)vanadium (prepared by the method of I. M. Thomas, Can. J. Chem. 39, 1386 (1961)), was placed in a 100-ml. round-bottom flask equipped with a magnetic stirring bar and a Claisen adapter holding a reflux condenser (protected from the atmosphere by a nitrogen blanket) and a pressure-equalized dropping funnel. A solution composed of 25 milliliters dry nitrogen-purged benzene and 25.0 milliliters (0.188 gram-mole) β-isobutoxyethanol was added from the dropping funnel to the reaction flask, with stirring, over a period of about 20 minutes. When the reaction mixture had then been refluxed for 20 minutes, it was transferred to a rotary film evaporator; all the volatile components of the mixture were removed, the resulting residue being held at 65° and 0.2 mm. pressure for 30 minutes. A 6.75-gram yield (90.4% of theoretical) of a red-brown oil was thus obtained. For ease of handling the product was dissolved in benzene, giving an 8.56% (W/W) solution. The solution analyzed for 0.9% vanadium (0.85% vanadium, calcd.).

EXAMPLE II

Preparation of tetrakis(β-ethoxyethoxy)vanadium from vanadium tetrachloride

A solution of 5.30 milliliters (0.05 gram-mole) vanadium tetrachloride in 50 milliliters of dried nitrogen-purged hexane was charged to a 250-ml. 4-necked round-bottom flask equipped with a mechanical stirrer, pressure-equalized dropping funnel, serum-stoppered gas inlet tube, and a reflux condenser protected from the atmosphere by a nitrogen blanket. A solution of 21.30 milliliters (0.22 gram-mole) β-ethoxyethanol in 25 milliliters dried, nitrogen-purged hexane was placed in the dropping funnel and subsequently added therefrom to the reaction flask with vigorous stirring over a period of about 10 minutes; 30.6 milliliters (0.22 gram-mole) triethylamine in 25 milliliters hexane was then added slowly with stirring. Finally the reaction mixture was refluxed, with stirring for 1 hour. When the mixture had cooled to room temperature, it was filtered through a sintered glass pressure funnel using nitrogen as a pressure source. The residue was washed several times with hexane, the wash liquor being combined with the main filtrate.

The combined filtrate and washings were placed on a rotary film evaporator and volatiles removed. The residual dark brown oil was held at about 75° C. (0.05 mm. Hg pressure) for 1 hour; yield=16.4 grams (80.6% of theoretical). An infrared spectrum of this material showed no measurable amount of alcohol but was otherwise very similar to the parent β-ethoxyethanol.

*Analysis.*—Found: %C, 45.5; %H, 8.6; %V, 12.61.*
Calculated: %C, 47.2; %H, 8.9; %V, 12.53.*

EXAMPLE III

Copolymerization of ethylene/propylene with tetrakis (β-ethoxyethoxy)vanadium/diisobutyl aluminum chloride coordination catalyst One hundred milliliters of dried, nitrogen-purged tetrachloroethylene was placed in a 250-ml. 4-necked round-bottom flask equipped with gas inlet tube, mechanical stirrer, serum-stoppered gas inlet tube, and a Claisen adapter holding a reflux condenser and a thermometer. Ethylene and propylene were metered separately through flowmeters through columns of Linde 5A Molecular Sieves into the gas inlet tube and introduced under the surface of the polymerization solvent; exit gases were led from the top of the reflux condenser through an empty backup trap, a mineral oil bubbler, another flowmeter, and out to the atmosphere. This system constitutes a batch atmospheric pressure reactor.

The stirred tetrachloroethylene was saturated with ethylene and propylene, the monomers being fed at 0.5 liter/minute and 1.3 liters per minute, respectively. When the temperature had been adjusted to 25° C. and saturation was indicated by the steadiness of the exit flowmeter, 0.10 milliliter (0.00051 gram-mole) neat diisobutyl aluminum chloride and 0.25 milliliter of a 0.087 M solution of tetrakis (β-isobutoxyethoxy)-vanadium in hexane, in that order, were injected through the serum cap, using 1.00-ml. hypodermic syringes. Addition of the vanadium com-

---

* Vanadium analyses on those compounds are difficult; the reported value was obtained by ignition of a hexane solution of the compound to $V_2O_5$. A permanganate volumetric method gave 10.8% V. The oxidation state of the vanadium was determined polarographically to be 96.7% $V^{+4}$ and 3.3% $V^{+5}$.

pound caused the solution to turn amber; after about 1 minute the exit flowmeter showed that the solution was absorbing monomers, and the temperature began to rise spontaneously. The temperature was maintained at 25° C. throughout by means of an ice-water bath. Within 5 minutes the solution had become noticeably more viscous, and at 30 minutes the solution had become extremely viscous. The catalyst was deactivated at 30 minutes by injecting about 2 milliliters of methanol.

Catalyst residues were removed from the resultant solution by washing it twice with 10% acetic acid; trace acid was removed, in its turn, by washing the solution three times with water. The polymer, obtained by evaporating the solvent, was dried in air and then overnight in a vacuum oven at about 80° C. The yield amounted to 2.95 grams, representing a catalyst efficiency of 135,000 (grams of polymer/mole vanadium). An infrared spectrum of a film pressed from this ethylene/propylene copolymer showed it to contain 41.8% propylene; the polymer exhibited an inherent viscosity of 3.39 (0.1 wt. percent in tetrachloroethylene at 30° C.).

EXAMPLE IV

Tripolymerization of ethylene/propylene/1,4-hexadiene with tetrakis ($\beta$-isobutoxyethoxy) vanadium/diisobutyl aluminum chloride In an apparatus identical to that of Example III an identical procedure was used except that 0.70 ml. (0.0059 gram-mole) of 1,4-hexadiene (chromatographed through neutral alumina immediately before use) was introduced between the additions of diisobutyl aluminum chloride and tetrakis ($\beta$-isobutoxyethoxy) vanadium. Following injection of the tetrakis ($\beta$-isobutoxyethoxy) vanadium, an amber color occurred; after about 1.5 minutes the temperature in the reactor began to rise spontaneously and the exit flowmeter gave evidence that monomer gases were being absorbed in the solution. By 20 minutes the reaction mixture had become very viscous. After catalyst deactivation and copolymer isolation had been carried out by the procedure of Example III, there was obtained 1.91 g. (catalyst efficiency of 114,000) of an ethylene/propylene/ 1,4-hexadiene copolymer containing 40.6% propylene and 2.0% 1,4-hexadiene; the inherent viscosity of the copolymer was 2.29 (0.1 weight percent in tetrachloroethylene at 30° C.).

EXAMPLE V

Tripolymerization of ethylene/propylene/1,4-hexadiene with tetrakis ($\gamma$-ethoxypropoxy) vanadium/diisobutyl aluminum coordination catalysts An apparatus and procedure identical to that of Example IV, were employed except that the catalyst was prepared from 0.40 milliliter (0.00206 gram-mole) of diisobutyl aluminum chloride and 0.30 milliliter of a 0.162 M solution of tetrakis (2-ethoxypropoxy) vanadium. Rate studies showed that at 30 minutes about 2.4 grams of polymer had been formed. In this experiment polymerization was allowed to proceed for 45 minutes at the end of which time 2.67 grams of polymer (catalyst efficiency=55,000) was isolated as in Example III. IR showed the ethylene/propylene/1,4-hexadiene copolymer to contain 35.5% propylene and 3.2% 1,4-hexadiene. The inherent viscosity was 2.34 (0.1 wt. percent in perchloroethylene at 30° C.).

EXAMPLE VI

Tripolymerization of ethylene/propylene/1,4-hexadiene with catalyst pre-formed by mixture of tetrakis ($\beta$-ethoxyethoxy) vanadium, diisobutyl aluminum chloride, and 1,4-hexadiene An apparatus similar to that used in Examples III–V was modified to contain a pre-mix chamber; a 2.00-ml. syringe with stopcock was permanently mounted by means of the serum cap in the injection port; the syringe plunger was not inserted in the syringe but rather the syringe was stoppered with a stopper containing a glass T through the perpendicular arm of which was fed a stream of nitrogen. In this pre-mix syringe were placed 0.10 milliliter (0.00051 gram-mole) diisobutyl aluminum chloride, 0.80 millilter 1,4-hexadiene, and 0.25 milliliter of a 0.0874 M solution of tetrakis ($\beta$-isobutoxyethoxy) vanadium in hexane, the mixture being blanketed by nitrogen as described above; after a few seconds pre-mix time the syringe stopcock was opened and the open end of the glass T closed in order to allow the nitrogen to push the catalyst solution into the reaction flask containing the saturated tetrachloroethylene solution (as in Examples III–V). Polymerization was allowed to proceed for 30 minutes at which time the reaction mixture was worked up as previously described.

There was thus obtained 1.33 grams of ethylene/propylene/1,4-hexadiene copolymer (catalyst efficiency=61,000) containing 38.2% propylene and 2.67%, 1,4-hexadiene, and having an inherent viscosity of 2.15 (0.1 wt. percent in tetrachloroethylene at 30° C.

EXAMPLE VII

Preparation of $(CH_3CH_2-O-CH_2CH_2-O)_2VCl_2$

To 75 milliliters of methylene chloride ($CH_2Cl_2$) at room temperature were added in turn, with stirring: a solution of 0.02 gram-mole of $VCl_4$ in 11.2 milliliters of tetrachloroethylene; 0.04 gram-mole of $\beta$-ethoxyethanol. After being stirred for 1 hour the resulting mixture was evaporated to dryness by nitrogen and then kept under vacuum (0.1 mm. Hg) at room temperature overnight. The $(CH_3CH_2-O-CH_2CH_2-O)_2VCl_2$ thus obtained was recrystallized by heating it in refluxing methylene chloride for 8 hours and then filtering. The solid product thus separated was washed with hexane and dried under vacuum (0.1 mm. Hg) for 3 hours at room temperature.

*Analysis.*—Found: percent C, 32.2; percent H, 5.9; percent Cl, 24.1. Calculated: percent C, 32.0; percent H, 6.0; percent Cl, 23.7.

Tripolymerization of ethylene/propylene/1,4-hexadiene

The reactor was a 2-liter 4-neck resin kettle fitted with a thermometer, a mechanical stirrer, a gas inlet and a gas outlet device.

One liter of tetrachloroethylene was introduced into the above reactor at 25° C. and saturated with a mixture of dry ethylene and propylene supplied at the respective ratio of 1 liter/min. and 3.2 liters/min. While monomer inflow and agitation continued as before, 0.0025 gram-mole of diisobutyl aluminum monochloride, 0.05 gram-mole of 1,4-hexadiene, and 0.0002 gram-mole of $$(CH_3CH_2-O-CH_2-CH_2-O)_2VCl_2$$

in about 20 ml. methylene chloride, prepared above, were introduced in turn. The Al:V ratio was thus 12.5:1. The resulting mixture was stirred while the temperature was maintained at 25° C. Fifteen minutes after the vanadium compound had been added, a second 0.0025 gram-mole portion of diisobutyl aluminum chloride was injected. During the polymerization period aliquots of the tripolymer solution were withdrawn at 10-minute intervals with a hypodermic syringe, deactivated with methanol, and concentrated to constant weight. The following data were obtained.

| Time: | Grams polymer 25/ml. solution |
|---|---|
| 10 | 0.059 |
| 20 | 0.145 |
| 30 | 0.190 |
| 40 | 0.202 |
| 50 | 0.216 |
| 60 | 0.220 |

EXAMPLE VIII (A) An ethylene/propylene/1,4-hexadiene tripolymer was prepared at the rate of 92.0 grams per hour as 7.4% (solids) solution in hexane in a 1.018-liter continuous high pressure reactor operated according to the following conditions:

| | |
|---|---|
| Temperature | 20° C. |
| Pressure p.s.i.g. | 400 |
| Residence time minutes | 30 |
| Tetrakisethoxyethoxy vanadium millimole/hr | 0.51 |
| Diisobutyl aluminum monochloride millimole/hr | 0.51 |
| Aluminum: Vanadium molar ratio | 15:1 |
| Ethylene lb./hr | 0.1424 |
| Propylene lb./hr | 0.5180 |
| 1,4-hexadiene lb./hr | 0.05898 |
| Total hexane liter/hr | 1.449 |
| Hydrogen g.-mol/hr | 0.0014 |

The copolymer isolated analyzed for 37.0 weight percent propylene units and 4.01 weight percent total hexadiene monomer units. The Wallace plasticity was 40.5.

(B) The high pressure continuous reactor described above was again used at a pressure 400 p.s.i.g. and at a temperature of 20° C. An ethylene/propylene/1,4-hexadiene copolymer was prepared in hexane at the rate of 185.8 grams/hour as a 5.18% by weight solids solution. The reactor conditions described above were changed to correspond to the following:

| | |
|---|---|
| Residence time minutes | 10 |
| Tetrakisethoxyethoxy vanadium millimoles/hr | 1.51 |
| Diisobutyl aluminum monochloride millimoles/hr | 22.65 |
| Ethylene lb./hr | 0.2690 |
| Propylene lb./hr | 1.4889 |
| 1,4-hexadiene lb./hr | 0.1167 |
| Total hexane liters/hr | 4.296 |
| Hydrogen g-mol/hr | 0.00216 |

The copolymer analyzed for 41.5% by weight propylene and 2.56% by weight total hexadiene. The Wallace plasticity was 40.5.

(C) An ethylene/propylene/1,4-hexadiene copolymer was prepared at the rate of 115.3 grams/hour as a 6.046% by weight hexane solution in the high pressure reactor described in Part A above using the same conditions of temperature and pressure. The other variables were changed as follows:

| | |
|---|---|
| Residence time minutes | 20 |
| Tetrakisethoxyethoxy vanadium millimole/hr | 0.765 |
| Diisobutyl aluminum monochloride millimoles/hr | 11.5 |
| Ethylene lb./hr | 0.2130 |
| Propylene lb./hr | 0.7775 |
| 1,4-hexadiene lb./hr | 0.08842 |
| Total hexane liters/hr | 2.199 |
| Hydrogen g.-mol/hr | 0.00184 |

The copolymer analyzed for 37.0% propylene monomer units and 3.68% by weight total hexadiene monomer units. The Wallace plasticity was 51.

Since many other embodiments of this invention will occur to those skilled in the art in the light of the above disclosure, the scope of this invention is not to be limited to the specific embodiments disclosed hereinabove, but is to be construed as limited only by the appended claims.

I claim:

1. Alkoxyalkoxy vanadium compounds having the formula:

$$[R-O-Y-O]_bVX_{4-b}$$

wherein R is a $C_1$ to $C_6$ alkyl radical, Y is an alkylene radical having from 2 to 3 carbon atoms in the chain linking oxygen atoms and having a total of up to 10 carbon atoms, X is chlorine or bromine and $b$ is an integer from 1 to 4 inclusive.

2. Composition of claim 1 wherein R is ethyl, Y is dimethylene and $b$ is 4.

3. Composition of claim 1 wherein R is isobutyl, Y is dimethylene and $b$ is 4.

4. Composition of claim 1 wherein R is ethyl, Y is dimethylene, $b$ is 2 and X is chlorine.

5. A process for the preparation of alkoxy alkoxy vanadium compounds which comprises reacting about $b$ molar proportions of R—O—Y—OH with one molar proportion of $VX_4$, removing HX from the reaction mixture and recovering an alkoxyalkoxy vanadium compound having the formula:

$$[R-O-Y-O]_bVX_{4-b}$$

wherein R is a $C_1$ to $C_6$ alkyl radical, Y is an alkylene radical having from 2 to 3 carbon atoms in the chain linking the oxygen atoms and having a total of up to 10 carbon atoms, $b$ is an integer from 1 to 4 inclusive and X is chlorine or bromine.

6. Process of claim 5 in which the reaction is conducted in an inert organic solvent for said $$[R-O-Y-O]_bVX_{4-b}$$

7. Process of claim 6 in which the HX is recovered by addition of a lower alkyl tertiary amine to form a salt, and removing said salt from the reaction product prior to recovery said $[R-O-Y-O]_bVX_{4-b}$.

No references cited.

TOBIAS E. LEVOW, *Primary Examiner.*

A. P. DEMERS, *Assistant Examiner.*

UNITED STATES PATENT OFFICE
CERTIFICATE OF CORRECTION

Patent No. 3,413,325                                                      November 26, 1968

Henry Edward Berkheimer

It is certified that error appears in the above identified patent and that said Letters Patent are hereby corrected as shown below:

Column 7, line 12, "0.51" should read -- 7.65 --.

Signed and sealed this 10th day of March 1970.

(SEAL)
Attest:

Edward M. Fletcher, Jr.                              WILLIAM E. SCHUYLER, JR.
Attesting Officer                                                 Commissioner of Patents